May 12, 1936.  L. S. SPETH  2,040,448

ELECTRIC GENERATING SYSTEM

Filed June 20, 1933  2 Sheets-Sheet 1

INVENTOR.

Leonard S. Speth

BY

Slough and Canfield

ATTORNEY.

May 12, 1936.   L. S. SPETH   2,040,448
ELECTRIC GENERATING SYSTEM
Filed June 20, 1933   2 Sheets-Sheet 2
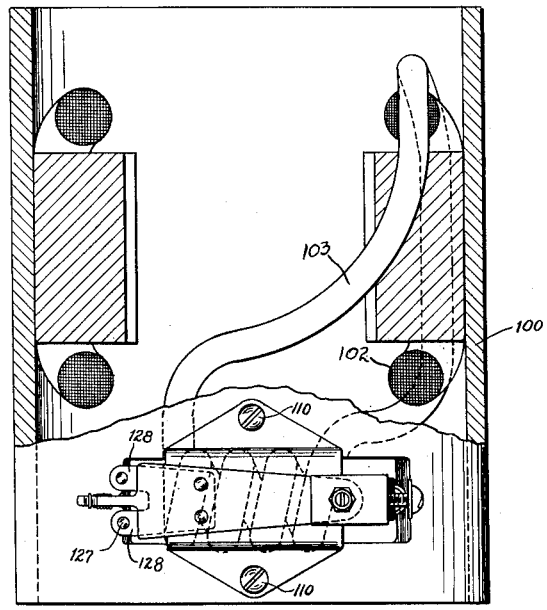
Fig 5
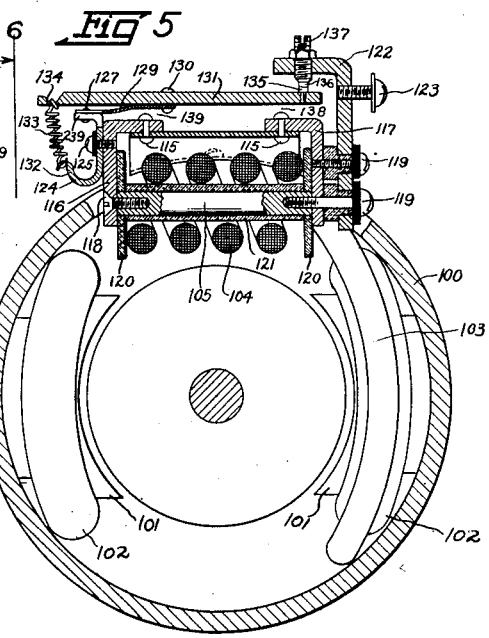
Fig 6
Fig 4
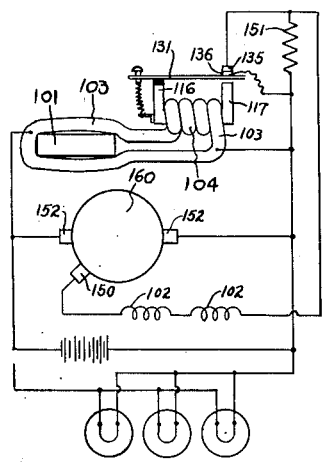
Fig 7
INVENTOR.
Leonard S. Speth
BY
Slough and Canfield
ATTORNEY.

Patented May 12, 1936

2,040,448

UNITED STATES PATENT OFFICE 2,040,448

ELECTRIC GENERATING SYSTEM

Leonard S. Speth, Cleveland, Ohio, assignor, by mesne assignments, to The Leece-Neville Company, Cleveland, Ohio, a corporation of Ohio Application June 20, 1933, Serial No. 676,632

18 Claims. (Cl. 171—223)

This invention relates to electric generating systems and apparatus, and particularly to generating systems and apparatus in which an electric generator is rotatably driven by a variable speed source of power.

Typical of such generating systems and apparatus is that employed on automotive vehicles, wherein an electric generator is driven by the vehicle engine.

Such systems commonly include a storage battery, lamps and other apparatus energized by current from the generator, and various means have been accordingly devised to regulate or control the output of the variable speed generator to maintain the same within limits suitable for the energized apparatus.

For example, in some systems the current output has been controlled or regulated by the so-called "third brush" generator construction; in another system, the generated voltage has been regulated by so-called "voltage regulation" apparatus accessory to the generator.

Both the current regulation systems and voltage regulation systems heretofore employed have merits which have led to their use on motor driven vehicles.

The control of the generator output by regulating its voltage is generally recognized as superior to the current regulation, particularly when storage batteries and lamps are to be energized by the generator; but its general adoption has been prevented by the relatively great cost of the apparatus accessory to the generator by which the voltage regulation is effected.

In a typical voltage regulation system and apparatus for example, a regulating panel is provided on which is mounted an electro-magnetic relay having its winding energized by the generator voltage; and the contacts of the relay control the energization of the generator field winding. Upon a rise of voltage above the predetermined desired value, the relay contacts are operated magnetically to break the field winding circuit, or to insert resistance in series with the field winding or otherwise to weaken the field to effect a reduction of voltage. When the voltage falls to the predetermined value, the relay contacts are operated by a spring to restore the field circuit. In operation, such relays open and close rapidly with a vibratory movement.

It is the added cost of manufacturing and installing such regulator panels and the vibratory electro-magnetic relays and other necessary parts thereon which has largely prevented the general adoption of voltage regulated generator systems for automotive vehicles, and which has confined its use to a limited field of application.

The instant invention therefore has for one of its objects the provision of an improved method and means whereby the voltage output of a variable speed electric generator may be regulated to a substantially constant value at all speeds within a predetermined working speed range.

Another object is to provide an improved electric generator construction which will deliver at its output terminals a substantially constant voltage at all speeds within a predetermined working speed range.

Another object is to provide an improved method and means whereby the current output of a variable speed generator may be limited to a predetermined maximum, and also the voltage output thereof may be regulated to a substantially constant value at all speeds within a predetermined working speed range.

Another object is to provide an improved electric generator construction which will deliver at its output terminals a substantially constant voltage and a current load limited to a predetermined maximum at all speeds of the generator within a predetermined working speed range.

Another object is to provide an improved regulating apparatus for effecting voltage regulation of a variable speed generator.

Another object is to provide an improved generator field circuit controller for effecting voltage regulation of a variable speed generator, and which will be cheaper to manufacture than the electro-magnetically vibrated relay apparatus now employed for this purpose.

Another object is to provide an improved field energizing circuit for variable speed voltage regulation electric generators.

Another object is to provide, in a voltage regulated variable speed generating system of the type employing a vibrating switch contact in the field circuit, improved means for minimizing the tendency to arc at the contacts.

Another object is to provide, in a voltage regulated variable speed generating system of the type in which the field energization is rapidly changed, improved means for increasing the frequency of the changes to correspondingly increase the frequency of the resulting pulses of current in the work circuit of the generator.

Another object is to provide an accessory apparatus which may be installed upon commercial variable speed generators to adapt them to automatically regulate their voltage output to a substantially constant value at all speeds within a working speed range.

My invention is fully disclosed in the following description taken in connection with the accompanying drawings in which:

Fig. 4 is a cross-sectional end view illustrating a modification of my invention which I may employ in connection with a bi-polar type of generator;

Fig. 5 is a top plan partial view, partly broken away, of the generator shown in Fig. 4;

Fig. 6 is a view taken from the plane 6—6 of Fig. 4; and

Fig. 7 is a diagrammatic view of an electric generating system with which my invention may be practiced and illustrating in simplified diagrammatic form some of the elements of Figs. 4-6 inclusive.

Figure 1:
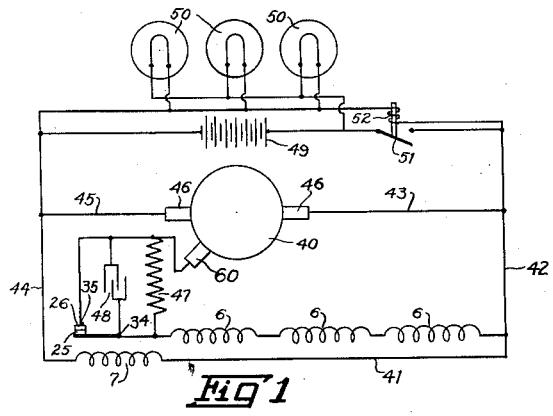
Fig. 1 is a diagram of electrical connections and apparatus illustrating in diagrammatic form some of the features of an embodiment of my invention.
Figure 3:
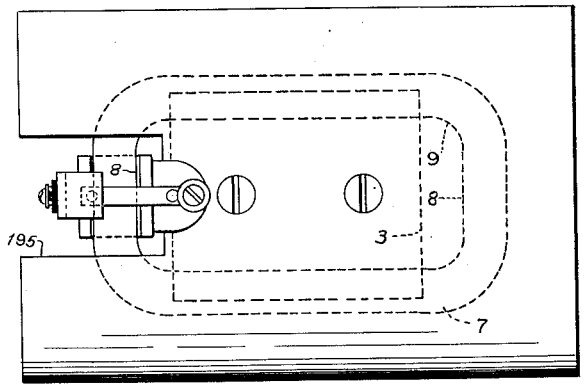
Fig. 3 is a top plan view of the generator elements of Fig. 2.
Figure 2:
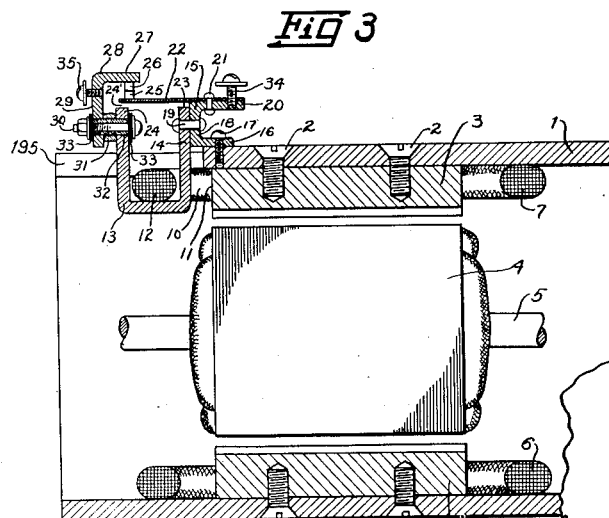
Fig. 2 is a simplified longitudinal cross-sectional view of an electric generator forming a partial embodiment of my invention.

Referring to the drawings, I have shown in Figs. 1, 2, and 3, one embodiment of my invention and a system of circuit connections and apparatus whereby the embodiment of Figs. 2 and 3 may be practiced.

In Fig. 2 at 1, I have shown the hollow cylindrical steel shell constituting the yoke of an electric generator field. Such a shell type yoke is well known in this art and constitutes a part of a housing for the generator. The end plate, bearings for the armature, shaft, etc., have been omitted for simplicity inasmuch as these parts constitute no essential part of my invention and are well understood by those skilled in this art.

Secured to the inner wall of the shell 1 as by screws 2—2 and projecting inwardly radially therefrom, I have shown at 3—3 two field poles. The generator of Fig. 2 is a multi-polar generator having a total of four poles 3, two only of which are shown in Fig. 2, in diametrically opposed relation.

An armature 4 supported on a shaft 5 may be rotatively driven between the poles 3 in a well known manner.

Each of the poles 3 has a winding for energizing the same; and the generator under consideration having four poles is provided with windings 6—6—6 on 3 of the poles and a winding 7 on the fourth pole.

The field windings 6 and 7 are all of the same form and as usual in such constructions are preferably form wound. The poles 3 are rectangular as indicated in Fig. 3 being longer in the axial direction of the generator and the field windings are preferably form wound to lie closely adjacent to the poles 3 on their long side and to clear the ends of the poles as at 8 due to the relatively large radius, as at 9, to which the coils are wound. A space 10 is thus provided between the end 11 of the pole 3 and the end convolutions 12 of the windings.

At one end of the windings 7 as shown in Figs. 2 and 3, a U-shaped core 13 of iron or other ferrous material is linked with the windings 7 by projecting one leg 14 of the U upwardly through the space 10 above described. A recess 195 is cut or otherwise formed in the shell 1 upwardly through which the core is projected.

The core 13 is mounted upon the shell 1 by means of a channel shaped bracket 15, having one leg 16 secured to the shell 1 by a screw 17 and having the web 18 of the channel riveted as at 19 to the leg 14 of the core 13.

Riveted to the other leg 20 of the channel as at 21 is a resilient steel or other ferrous, magnetically tractible reed-like armature 22 which extends across and adjacent to the pole ends 23 and 24 of the U-shaped core. An air gap 24' is thus provided between the pole end 24 and the armature 22.

By this construction it will now be clear that current flowing in the windings 7 to produce field magnetism in the pole 3 of the generator will also produce magnetism in the core 13 which, acting across the air gap 24' will attract the armature 22 against its inherent resilience.

An electric contact 25 is mounted on the armature 22 and engages a mating contact 26 supported upon the overhanging arm 27 of a bracket 28 a vertical leg 29 of which is rigidly secured to and electrically insulated from the core 13 by a bolt 30, an insulating spacer 31 and the well known insulating sleeve or bushing 32 and washers 33 associated with the bolt 30.

An electric circuit terminal screw 34 may be associated with the contact 25 by being threaded into the leg 20 of the bracket above described and a terminal screw 35 may be provided corresponding to the contact 26 and threaded into the leg 29 of the bracket.

Referring now to the diagram of Fig. 1, the generator as a whole indicated conventionally at 40 energizes its own field winding, the winding of one pole, namely the winding 7 being connected by wires 41, 42, 43, 44, and 45 directly across the brushes 46—46 of the generator. The windings 6—6—6 are all connected in series and are energized by current from the third brush 60 of the generator, either through contacts 25—26 when closed, or through the resistance 47 when the contacts are open. A condenser 48 may be provided, if desired, to suppress arcing which may occur at the contacts 25—26 when they open.

The diagram, Fig. 1, otherwise comprises a storage battery 49 connected across the mains 42 and 44 and therefore across the generator brushes and a plurality of lamps 50—50 connected across the mains 42 and 44.

The contacts 25 and 26 of Fig. 1 may be those of Fig. 2 and the points 34 and 35 of Fig. 1 illustrate the connection which may be made to the screws 34 and 35 of Fig. 2 in order to connect the apparatus of Fig. 2 in a diagram such as Fig. 1. As will be understood, Fig. 2 illustrates the said connections as they would actually be made in a commercial generator wherein the generator return circuit is customarily grounded. Fig. 1 illustrates the complete circuits without ground connections and those skilled in the art will clearly understand how to adapt the ungrounded system of Fig. 1 to a grounded system including the connections of Fig. 2 without further description herein.

At 51 I have indicated a switch, operable by a winding 52 energized directly across the brushes 46 of the generator 40 to perform the well known function of closing the circuit through the battery 49 only when the generator is generating a voltage sufficient to balance or to charge the battery.

In the operation of the form of my invention shown in Figs. 1 to 3 inclusive, when the generator armature 4 is rotated, and its speed gradually increased, its field windings 6 and 7 are energized by a gradually increasing voltage and current. To properly charge the battery 49, assuming the same to be a "6 volt" battery, the generator voltage should not rise to a value exceeding some predetermined value such, for example, as 7.5 volts.

The energization of the winding 7 besides producing flux in the field pole 3, produces magnetic flux in the core 13, this flux flowing in the U-shaped core and across the air gap 24' through the armature 22.

The rising voltage of the generator as its speed increases, increases the energization of the field winding 7; and the resilience of the armature 22, length of air gap 24' and other features of the construtcion as will be understood by those skilled in this art, are so designed that when the voltage impressed on the field winding 7 rises to the predetermined value such as 7.5 volts, the flux generated in the core 13 will be sufficient to attract the armature 22 and separate the contacts 25—26. The circuit to the field windings 6—6—6 is thus broken, or the energization thereof is greatly reduced by insertion of a resistance such as that at 47, Fig. 1, and the generated voltage accordingly falls. The falling voltage decreases the energization of the winding 7 which decreases the flux in the core 13 and a point is reached at which the resilience of the armatur 22 will cause it to retract from the pole 24 and to close the contacts 25—26 re-establishing the field circuit for the windings 6.

The voltage again rises and again the contacts 25—26 open and this action continues, the armature 22 moving with a rapid vibratory movement, to rapidly open and close the contacts 25—26. The voltage output of the generator thus is prevented from rising above 7.5 volts, for example, and may be prevented from falling any substantial amount by suitably determining the resilience of the armature 22 and thus the resultant voltage impressed by the generator on the battery and lamp circuit, is substantially constant at all speeds above the minimum speed at which, with full field energization, it can generate 7.5 volts. Such a range of speed may be referred to as the working speed range.

It is important that the weakening of the field effected by opening the contacts 25—26 shall occur rapidly, that is to say, that the field current of the windings 6 shall be reduced rapidly. There are two principal reasons among others. If the field dies out slowly, there will be a tendency to arc at the contacts 25—26 and the slower the current dies out the more will be prolonged any arc which occurs; and second, the slight fluctuations of voltage, effected by opening and closing of the contacts 25—26 and the accompanying fluctuations of field strength, may cause a visible flickering of lamps 50—50 energized by the circuit which obviously is objectionable.

According to my invention, both of these and other objectionable features of operation which are introduced into a generating system, having a battery and lamps in the circuit, by the rapid opening and closing of the field circuit, are eradicated in a novel manner. For this purpose the winding 7 is wound reversely as to polarity with respect to the windings 6. That is to say, in a multi-polar generator having for example four field windings, the polarity of the windings alternates proceeding around the generator and I reverse the polarity of one of these windings and utilize it for the winding 7.

Referring to Fig. 1, when the contacts 25—26 open, the flux produced by the windings 6—6—6 immediately begins to decay causing a reduction of voltage and this action is accelerated by the flux produced by the winding 7 which is in the reverse direction tending to generate a counter voltage. Thus the decay of field flux and the corresponding decay or reduction of generated voltage, occurs very rapidly and much more rapidly than if the reverse winding 7 were not employed.

The winding 7 is preferably weaker as to ampere turns than a winding 6 so that its reverse magnetic motive force does not greatly reduce the total flux producing magnetic motive force of the field windings taken as a whole, and therefore has little effect upon the field strength as a whole or upon the output of the generator; and whatever diminution of output does result from the reversed winding 7 can easily be made up or compensated for by a corresponding increase of copper in the armature winding.

By thus providing a winding 7 relatively weak, and in the reverse direction, it will have sufficient magnetic motive force to cause a rapid drop of voltage when the contacts open, but will retard very little the building up of the total generator flux of the windings 6—6—6, when the contacts 25—26 again close. Thus the voltage will build up very rapidly on closure of the contacts due to the rapid overpowering of the winding 7 by the windings 6—6—6 when energized and will also die out very rapidly due to the opposition of the winding 7, when the windings 6—6—6 are deenergized.

The result is a very rapid change of voltage concurrent with the opening and closing of the contacts 25—26 and this high frequency diminishes or entirely obviates objectionable flickering of lamps such as 50—50 connected to the generator.

Again, due to the presence and above described action of the opposing or "bucking" winding 7, a lower resistance 47 may be employed to effect a given reduction of field strength and corresponding reduction of voltage upon opening of the contacts; and with less resistance 47, there will be, across the contacts 25—26 at their time of opening, a lesser potential and hence less tendency to spark.

Thus, as set forth above, the frequency of fluctuation of voltage resulting from the periodic change of field strength is greatly increased to eliminate flickering of the lamps, and the tendency to spark or arc at the contacts 25—26 is greatly reduced or eliminated, and both of these results are obtained by employment of the reverse field winding 7.

As will now be clear, by the embodiment of my invention illustrated in Figs. 1 to 3, I have provided a means and method for regulating the voltage output of a variable speed generator wherein a field winding of the generator may be employed to function both as a field winding and as the exciting winding for a switch having contacts controlling the energization of the field circuit in a manner to maintain a voltage substantially constant, or within predetermined maximum and minimum limits, throughout a working speed range. The elements of the switch illustrated in Figs. 2 and 3 are adaptable to be mounted upon the generator itself thus dispensing with a separate supporting panel or the like. The generator, including its regulating switch therefor, may be manufactured as a complete self-regulating generator unit, the generator delivering at its terminal brushes the said substantially constant voltage. Furthermore, where high frequency of voltage regulating fluctuations and/or reduced tendency to spark at the contacts is important or desirable, I have, as hereinbefore described, provided means for effecting the same by employing one reversed field winding and energizing the same across the generator brushes independently of the circuit energizing the other field windings 6—6—6.

While I have illustrated at 48 a condenser, it may be omitted and is not an essential part of my invention.

One of the advantages of my invention as set forth above is that the cost of producing a voltage regulating generator is considerably reduced. The employment of a switch in the field circuit which can be mounted on the generator frame itself eliminates the necessity for an additional panel and support therefor; and the employment of the field winding as the energizing winding of the switch makes the provision of an electro-magnet especially for operating the switch unnecessary, and due to the bucking or reversed energization of the winding 7, less resistance in the unit 47 is necessary and the resistant unit becomes relatively small and simple and therefore cheaper.

The resistance unit 47, as in some prior art practice where resistance units are employed generally in generator field circuits, may be wound into a flat coil, inductively or non-inductively and attached to the outer surface of one of the field windings, as a support for the same.

In the foregoing I have shown and described apparatus whereby the voltage output of a generator driven at variable speed may be regulated to substantially a constant value. As hereinbefore mentioned, there are advantages to be obtained by what is called the "third brush" mode of generator regulation in which the current output is limited to a maximum predetermined value by armature reaction within the generator. I find that the voltage regulation system and apparatus of my invention hereinbefore described may be applied to a third brush current regulated generator thus providing a generator and system which will regulate both to a maximum current and to a substantially constant voltage at all speeds within the working range, and the invention has been illustrated herein in connection with a generator provided with third brush regulation.

A typical instance wherein it may be desirable to employ both current regulation and voltage regulation, is in a system in which the battery capacity is relatively great and which, when its state of charge is low, may, upon being charged, draw from the generator an excessively great current. The third brush regulation will protect the generator by limiting the possible current to a predetermined maximum and the voltage regulation will protect the battery by preventing an excess charging current from flowing into it. The voltage regulation additionally will charge the battery at the maximum permissible rate and taper the charge in the well known manner of voltage regulation charging systems and at the same time will protect any lamp in the circuit against damage from high voltage.

The system shown in the drawings employs both types of regulation, having the field windings 6—6—6 energized by current from the third brush 60 of the generator, either through contacts 25—26 when closed, or through a resistance 47 when the contacts are open, while the bucking field winding 7 is energized directly across the main brushes of the generator. The regulation of the voltage is thus effected as described hereinbefore, by opening the contacts 25—26 and breaking the field circuit of the windings 6—6—6 or by inserting the resistance 47 in series with the windings 6—6—6, the contacts being operated by flux from the field winding 7 all as described hereinbefore, while the current output is regulated as in any well known third brush generator. Thus the current limit regulation may be referred to as being super-imposed upon the voltage regulation.

While the invention has been described and illustrated in connection with a generator provided with third brush regulation, it should be understood that it is not limited to this type of generator but may be employed on generators without third brush regulation, in which case the windings 6—6—6 are energized directly from the main brushes of the generator instead of from the third brush 60.

The invention has been described in connection with a multi-polar generator having four poles. Obviously multi-polar generators with more than four poles may be employed with all of the advantages of my invention. The invention is likewise applicable, with slight changes, to bi-polar generators one form of which will now be described.

Referring to Fig. 4, and Fig. 5, I have shown a generator field shell 100 having poles 101 and field windings 102 thereon. A second winding 103 is superimposed around one of the windings 102 and is wound reversely with respect thereto, and is provided with a plurality of turns 104 adapted to encircle the core 105 of the switch device which is mounted on the end of the generator field shell 100.

The switch construction comprises a base 106 having a body portion 107 and a wing portion 108, the base being formed from sheet metal and the wing portion being perforated as at 109 whereby the base may be rigidly mounted on the generator shell 100 by screws 110.

The base 106 is preferably formed from non-magnetic material and has riveted at its opposite ends, as at 115, angle pieces 116 and 117 formed from steel or other magnetic material. A ferrous core 105 is connected to the angle members 116 and 117 by means of screws 118 and 119, and is encircled by a plurality of turns 104 of the winding 103. Insulating heads 120 and an insulating sleeve 121 may insulate the turns of the winding from the adjacent steel parts.

An angle form element 122 is rigidly secured to the angle element 117 by a pair of insulated screws 119 and the element 122 may be provided with a terminal contact screw 123 if desired.

A sheet metal three-legged bracket 124 is rigidly secured to the angle element 116 by a screw 125, and two of the legs thereof 126—126 have riveted thereto, as at 127, two of the legs 128 of the three-legged flat sheet metal spring 129, the remaining leg of the spring being riveted, as at 130, to a ferrous armature 131. The remaining leg 132 of the bracket 124 is hook form and is hooked through one end of a tension spring 133, the other end of which is hooked over a tail portion 134 of the armature 131 rearwardly of the bracket legs 126.

By this construction the armature 131 has a free resilient hinging movement upon the spring 129 and is resiliently sustained toward a counter-clockwise position by the spring 133. At the end opposite the spring 133 the armature 131 carries a contact 135 engaging a mating contact 136 on the end of an adjusting and supporting screw 137 threaded through the element 122.

Flux generated in the core 105 by the turns 104 of the winding 103 flows through the core, through the angle element 117, across the air gap 138 between the element 117 and the armature 131, through the armature 131, across the air gap 139 between the armature and the angle element 116, and through the angle element 116 back to the core 105.

The tractive effort of the magnetic flux in the air gaps will attract the armature 131 and open the contact at 135—136, whenever the current energization in the coil windings 104 exceeds a predetermined value.

The electro-magnetic device above described may be disposed with parts thereof, including the winding turns 104, within an aperture 140 formed in the shell 100 of the generator.

A suitable system for the generator of Figs. 4 and 5 is shown in Fig. 7. In this figure, some of the mechanical parts of Figs. 4 and 5 are shown reproduced in simplified form among which are the pole piece 101 of the generator, the loop of the winding 103 embracing this pole piece, the winding 104 energizing the pole pieces 116 and 117 of the vibratory relay, the armature 131 thereof, and the contacts 135 and 136, together with the resistance unit 151.

It will now be understood that the generator shown generally at 160 is energized by the field windings 102—102, the winding 103 opposing one of the windings 102.

The main field windings 102 are energized either through the contacts 135—136 when closed or through a resistance 151 when the contacts are open, by current from the generator brushes 150—152. The winding 103 is energized by current from the generator main brushes 152 and, acting upon the armature 131, controls the contacts 135—136, as above described.

When the terminal voltage of the generator reaches a predetermined value, the flux generated by the winding 103 becomes sufficient to open the contacts 135—136 so that the circuit to the field winding 102 is broken, or the energization thereof is greatly reduced by the insertion of a resistance such as that at 151. Upon weakening of the field, as described, the winding 103 being opposite to the windings 102 as to polarity, bucks the same and effects a rapid decay of flux in the pole 101, and thus accelerates the reduction of the voltage with the attendant advantages hereinbefore fully discussed.

It will be seen that the form of apparatus illustrated in Figs. 4 to 6 may be manufactured as a separate accessory to be sold to users of commercial generators not now equipped with voltage regulation to adapt the generator for this type of regulation.

While I have illustrated the accessory device of Figs. 4 to 6 as applied to a two-pole generator, it is apparent that it may be applied to generators having more than two poles.

In the form of the invention shown in Figs. 4 and 5, it will be observed that the winding 103 is a separate winding from the field windings 102—102. This not only adapts the invention to the two-pole type of generator as above referred to, but has other distinct advantages.

Such a winding may, as illustrated in the drawings, be formed into the plurality of turns 104 for energizing the relay core 105 with more flux than is possible where the core is simply looped through the field winding, as illustrated in Figs. 2 and 3. Thus a greater amount of magnetic tractive effort is available for operation of the relay.

Furthermore, this construction provides a self-contained or unitary construction where it is desired to manufacture the device as a separate accessory, as above described. By providing the winding 103 with a number of turns of small wire and bending the winding into the form illustrated comprising a loop for disposition around a pole, and comprising a number of turns 104 around the core of the relay, the relay and coil 103 may conveniently be assembled together as a separate unit.

To apply such a unit to a commercial generator, it is only necessary to mount the relay upon a generator frame, as described, and to dispose the loop 103 around the generator pole or around its field winding 102, and to alter the circuit connections as indicated by the diagrams.

In the practice of my invention, the effects of the voltage regulation upon the supplied system is similar to that of prior art voltage regulation systems. But the switch construction which I employ and its mode of operation distinguish from that of the prior art in, among other features, the complete elimination of the relatively expensive regulating panels and complete electro-magnetically operated switches thereon and other prior art accessory apparatus.

According to my invention, the switch contacts 25—26 or 135—136, controlling the field circuit and effecting voltage regulation to a substantially constant value, are operated by energy from a winding on a field pole. Thus I completely eliminate all electro-magnetic windings provided solely to effect voltage regulation. Although the regulating winding is a reverse winding, such winding is not provided solely to perform a voltage regulating function, because, according to my invention, such reverse field winding performs also the bucking function hereinbefore discussed which function of course is impossible with any voltage regulating relay winding of the prior art disposed external to the generator. Even in case of the two-pole generator, Figs. 4 to 6, wherein an additional winding 103 is provided to operate the voltage regulating contacts, such winding, due to its disposition on the field generator pole, performs the aforesaid bucking function which is impossible with the prior art external relay winding.

My invention is not limited to the exact details of construction shown and described. Other changes and modifications may be made therefrom without departing from the spirit and scope of the invention and without sacrificing its advantages.

I claim:

1. In an electric generating system and apparatus, an electric generator having brushes and adapted to be driven at variable speed, the generator having a plurality of field windings energized commensurably with the generated voltage and of normal polarity, and a winding of reverse polarity connected in shunt across the generator brushes, a switch in the circuit of the normal polarity windings adapted to reduce the energization thereof upon operation of the switch contacts, and a magnetically tractible switch operating element disposed in the path of a portion of the flux generated by the reverse winding and adapted to operate the contacts whenever the generator voltage rises to a predetermined value.

2. In a voltage regulated electric generating system and apparatus, a variable speed electric generator comprising a relatively rotatable armature and magnetic field, a shunt field circuit therefor, a magnetically operable switch having contacts controlling the energization of the field circuit, a winding energized commensurably with the voltage generated in the armature for operating the switch to effect a decrease of field energization whenever the generated voltage rises to a predetermined value, said winding being arranged to supply to the generator armature a field flux of polarity tending to generate a counter electromotive force in the armature.

3. In a voltage regulating electric generating system and apparatus, a variable speed electric generator comprising a relatively rotatable armature and magnetic field, a shunt field circuit therefor, a magnetically operable device for controlling the energization of the field circuit, a winding energized commensurably with the voltage generated in the armature for operating the device to effect a decrease of field energization whenever the generated voltage rises to a predetermined value, the said winding being arranged to supply to the generator armature a field flux of polarity tending to generate a counter electromotive force in the armature.

4. In a system and apparatus for regulating to a substantially constant value the voltage output of a variable speed self-energizing multipolar generator having brushes and a plurality of main shunt field windings of normal polarity, a reversed winding for energizing one of the field poles with polarity reversed from normal, said reversed winding being connected in shunt across the generator brushes, a controller for controlling the energization of the circuit of the main windings, the controller being actuated by a portion of the field flux produced by said reversed winding, to cause the controller to operate to weaken the energization of the said main windings to effect a reduction of the generated voltage whenever the voltage rises to a predetermined value only, and the flux produced by the said reversed winding accelerating the decay of the generated voltage.

5. In a system and apparatus for regulating to a substantially constant value the voltage output of a variable speed self-energizing multipolar generator having brushes and a plurality of main shunt field windings of normal polarity, a reversed winding for energizing one of the field poles, with polarity reversed from normal, said reversed winding being connected in shunt across the generator brushes, a magnetically operable switch controlling the energization of the circuit of the main field windings, the switch being operable by a portion of the flux produced by the said reversed winding, to cause the switch to open its contacts to insert a resistance in the said field circuit to effect a weakening of the energization of the said main windings to effect a reduction of the generated voltage whenever it rises to a predetermined value and the flux produced by the reversed winding accelerating the decay of the generated voltage.

6. In an electric generating system and apparatus a two-pole electric generator adapted to be driven at variable speed, the windings of the poles being energized commensurably with the generated voltage and of normal polarity, one of the poles having also a winding energized commensurably with the generated voltage and of reversed polarity opposing the normal polarity winding of said pole, a controller controlling the normal polarity windings adapted to reduce the energization thereof upon operation of the controller, and the controller being operable by flux generated by the reversed polarity winding whenever the generated voltage rises to a predetermined value.

7. In an electric generating system and apparatus a two-pole electric generator adapted to be driven at variable speeds, the windings of the poles being energized commensurably with the generated voltage and of normal polarity, one of the poles having also a winding energized commensurable with the generated voltage and of reversed polarity opposing the normal polarity winding of said pole, a switch in the circuit of the normal polarity windings, adapted to reduce the energization thereof upon opening of the switch contacts, a magnetically tractible switch operating element disposed in the path of flux generated by the reversed polarity winding and adapted to operate the contacts whenever the generated voltage rises to a predetermined value, and a resistant unit adapted to be inserted into the circuit of the normal polarity windings upon opening of the switch contacts.

8. In an electric generating system and apparatus a two-pole electric generator adapted to be driven at variable speeds, the windings of the poles being energized commensurably with the generated voltage and of normal polarity, one of the poles having also a winding energized commensurable with the generated voltage and of reversed polarity opposing the normal polarity winding of said pole, a switch in the circuit of the normal polarity windings, adapted to reduce the energization thereof upon opening of the switch contacts, a magnetically tractible switch operating element disposed in the path of flux generated by the reversed polarity winding and adapted to operate the contacts whenever the generated voltage rises to a predetermined value, and a resistance unit adapted to be inserted into the circuit of the normal polarity windings upon opening of the switch contacts.

9. In an electric generator construction, a generator field yoke, a field pole, a normal polarity shunt field winding on the pole, a second shunt winding of opposite polarity on the pole energized commensurably with generated voltage, and an electro-magnetic voltage regulating switch controlling said normal polarity winding and energized by flux generated by the opposing winding.

10. In an electric generating system and apparatus, an electric generator adapted to be driven at variable speed, the generator having a plurality of shunt field windings energized commensurably with the generated voltage and of normal polarity, and a shunt field winding of reverse polarity, a switch in the circuit of the normal polarity windings adapted to reduce the energization thereof upon operation of the switch contacts, a local ferrous magnetic circuit element linked with the reverse winding, a magnetically tractible switch-operating element disposed in the path of the flux generated in the element by the reverse winding and adapted to operate the contacts whenever the generator voltage rises to a predetermined value.

11. In an electric generating system and apparatus, a generator comprising a relatively movable armature circuit and magnetic field, a first electro-magnetic shunt winding for producing the field, a second electro-magnetic shunt winding for producing a field of opposing polarity, control means comprising an electro-responsive voltage regulator for decreasing the energization of the windings whenever the generated voltage, responsive to relative speed of the armature circuit and field, reaches a predetermined high value and for increasing energization thereof whenever the voltage correspondingly reaches a predetermined lower value, to maintain the voltage substantially constant at all speeds above a predetermined minimum speed, said electro-responsive regulator comprising a winding energized by current in the said second field winding.

12. In an electric generating system and apparatus, a generator comprising a relatively movable armature circuit and magnetic field, a first electro-magnetic shunt winding for producing the field, a second electro-magnetic shunt winding for producing a field of opposing polarity, control means comprising an electro-responsive voltage regulator for decreasing the energization of the windings whenever the generated voltage, responsive to relative speed of the armature circuit and field, reaches a predetermined high value and for increasing energization thereof whenever the voltage correspondingly reaches a predetermined lower value, to maintain the voltage substantially constant at all speeds above a predetermined minimum speed, said electro-responsive voltage regulator comprising an electro-magnetic core element energized by the turns and current of the said second field winding.

13. In an electric generating system and apparatus, a generator comprising a relatively movable armature circuit and magnetic field, a first electro-magnetic shunt winding for producing the field, a second electro-magnetic shunt winding for producing a field of opposing polarity, control means comprising an electro-responsive voltage regulator for decreasing the energization of the windings whenever the generated voltage, responsive to relative speed of the armature circuit and field, reaches a predetermined high value and for increasing energization thereof whenever the voltage correspondingly reaches a predetermined lower value, to maintain the voltage substantially constant at all speeds above a predetermined minimum speed, said electro-responsive voltage regulator comprising an electro-magnetic core element energized by the turns and current of one of the field windings.

14. In combination, a generator having a field comprising a shunt field winding of normal polarity and a shunt winding of opposite polarity, and a voltage regulator adapted to vary the ampere turns of one of said windings and actuated by a portion of the magnetic flux of the generator field.

15. In combination, a generator having a plurality of field flux generating shunt windings, one of the windings being of opposite polarity to that of another winding, and a vibratory voltage regulator adapted to vary the ampere turns of the field flux producing winding to maintain the generated voltage substantially constant and itself actuated by magnetic flux generated by one of the field windings.

16. In combination, a generator having a plurality of field flux generating shunt windings, one of the windings being of opposite polarity to that of another winding, and a vibratory voltage regulator adapted to vary the ampere turns of the field flux producing winding to maintain the generated voltage substantially constant and itself actuated by magnetic flux generated by the opposing winding.

17. In an electric generating system and apparatus, a variable speed current regulating multi-polar electric generator, having main and third brushes and adapted to supply current up to a maximum value only, said generator having a plurality of main field windings of normal polarity and also having an auxiliary field winding connected across said main brushes, a third brush field circuit for energizing the main field windings of the generator, a magnetically operable voltage regulator for controlling energization of the main field circuit arranged to be operated by a portion of the field flux produced by said auxiliary field winding to effect a reduction of the field energization whenever the generated voltage rises to a predetermined value and to effect a regulation of the voltage to a substantially constant value in a working speed range, the said auxiliary field winding being of polarity reversed with respect to a normal polarity therefor.

18. In an electric generating system and apparatus, a variable speed current regulating multi-polar electric generator having main and third brushes and adapted to supply current up to a maximum value only, said generator having a plurality of main field windings of normal polarity and also having an auxiliary field winding connected across said main brushes, a third brush field circuit for energizing the main field winding of the generator, a magnetically operable voltage regulator for controlling energization of the main field circuit arranged to be operated by a portion of the field flux produced by said auxiliary field winding to effect a reduction of the field energization whenever the generated voltage rises to a predetermined value and to effect a regulation of the voltage to a substantially constant value in a working speed range, the said auxiliary field winding being of polarity reversed with respect to a normal polarity therefor, and the magnetically operable voltage regulator having a local ferrous magnetic circuit looped through the said auxiliary field winding in parallel to the field pole energized thereby.

LEONARD S. SPETH.